US009749109B2

(12) United States Patent
Lee et al.

(10) Patent No.: US 9,749,109 B2
(45) Date of Patent: *Aug. 29, 2017

(54) RESOURCE ALLOCATION METHOD AND A METHOD FOR TRANSMITTING/RECEIVING RESOURCE ALLOCATION INFORMATION IN MOBILE COMMUNICATION SYSTEM

(71) Applicant: LG ELECTRONICS INC., Seoul (KR)

(72) Inventors: Dae Won Lee, Seoul (KR); Young Woo Yun, Seoul (KR); Ki Jun Kim, Ansan-si (KR); Suk Hyon Yoon, Seoul (KR); Joon Kui Ahn, Seoul (KR); Dong Youn Seo, Seoul (KR); Eun Sun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

This patent is subject to a terminal disclaimer.

(21) Appl. No.: 14/854,544

(22) Filed: Sep. 15, 2015

(65) Prior Publication Data
US 2016/0006551 A1 Jan. 7, 2016

Related U.S. Application Data

(63) Continuation of application No. 14/515,320, filed on Oct. 15, 2014, now Pat. No. 9,191,173, which is a (Continued)

(30) Foreign Application Priority Data

Sep. 3, 2007 (KR) .................. 10-2007-0089202
Mar. 19, 2008 (KR) .................. 10-2008-0025480

(51) Int. Cl.
H04L 5/00 (2006.01)
H04L 12/801 (2013.01)
(Continued)

(52) U.S. Cl.
CPC .......... H04L 5/0053 (2013.01); H04L 5/0007 (2013.01); H04L 5/0039 (2013.01);
(Continued)

(58) Field of Classification Search
CPC . H04L 5/0023; H04L 5/0053; H04L 27/2601; H04L 49/90; H04L 49/901;
(Continued)

(56) References Cited

U.S. PATENT DOCUMENTS 5,870,391 A 2/1999 Nago
6,452,936 B1 9/2002 Shiino
(Continued)

FOREIGN PATENT DOCUMENTS

CN 1256033 6/2000
CN 1567761 1/2005
(Continued)

OTHER PUBLICATIONS

U.S. Appl. No. 13/941,277, Notice of Allowance dated Jan. 21, 2014, 9 pages.
(Continued)

Primary Examiner — Ian N Moore
Assistant Examiner — Brian T Le
(74) Attorney, Agent, or Firm — Lee Hong Degerman Kang Waimey

(57) ABSTRACT

According to one embodiment, a user equipment for use in a mobile communication system is configured to: receive control information including a first field and a second field via a control channel, the first field indicating one of N (N≥2) resource block group (RBG) sets and the second field including a bitmap, wherein each bit of the bitmap is used to indicate whether a corresponding resource block (RB) in the indicated one of the N RBG sets is allocated; interpret the first field and the second field for resource allocation in
(Continued)

the control information; and receive data using the control information. An RBG set n (0≤n<N) includes every $N_{th}$ RBG starting from $n_{th}$ RBG, an RBG includes one or more consecutive RBs, and an RB includes a plurality of consecutive subcarriers.

10 Claims, 12 Drawing Sheets

Related U.S. Application Data continuation of application No. 14/306,040, filed on Jun. 16, 2014, now Pat. No. 8,923,241, which is a continuation of application No. 13/958,388, filed on Aug. 2, 2013, now Pat. No. 8,787,297, which is a continuation of application No. 12/523,696, filed as application No. PCT/KR2008/001546 on Mar. 19, 2008, now Pat. No. 8,630,242.

(60) Provisional application No. 60/895,709, filed on Mar. 19, 2007, provisional application No. 60/915,099, filed on Apr. 30, 2007, provisional application No. 60/945,585, filed on Jun. 21, 2007, provisional application No. 60/978,398, filed on Oct. 8, 2007.

(51) Int. Cl.
    *H04W 72/04* (2009.01)
    *H04W 72/12* (2009.01)
    *H04W 88/02* (2009.01)

(52) U.S. Cl.
    CPC .......... *H04L 5/0041* (2013.01); *H04L 5/0044* (2013.01); *H04L 5/0058* (2013.01); *H04L 5/0091* (2013.01); *H04L 47/10* (2013.01); *H04W 72/04* (2013.01); *H04W 72/042* (2013.01); *H04W 72/0406* (2013.01); *H04W 72/1289* (2013.01); *H04W 72/121* (2013.01); *H04W 88/02* (2013.01)

(58) Field of Classification Search
    CPC ........... H04W 72/042; H04W 72/1289; H04W 72/005; H04W 72/121; H04W 72/0406; H04W 72/04; H04W 72/06; H04W 72/1205; H04W 72/0453; H04W 72/12; H04W 72/1268; H04W 72/1273
    See application file for complete search history.

(56) References Cited

U.S. PATENT DOCUMENTS

| | | |
|---|---|---|
| 6,842,487 B1 | 1/2005 | Larsson |
| 6,934,318 B2 | 8/2005 | Sarkar |
| 7,069,050 B2 | 6/2006 | Yoshida |
| 7,315,577 B2 | 1/2008 | Shao |
| 7,336,633 B2 | 2/2008 | Kruys |
| 7,386,076 B2 | 6/2008 | Onggosanusi |
| 7,885,176 B2 | 2/2011 | Pi et al. |
| 7,894,395 B2 | 2/2011 | Yi et al. |
| 7,953,169 B2 | 5/2011 | Lee et al. |
| 7,954,032 B2 | 5/2011 | Kim et al. |
| 7,995,661 B2 | 8/2011 | Xu |
| 8,014,352 B2 | 9/2011 | Tiirola et al. |
| 8,102,862 B2 | 1/2012 | Lee et al. |
| 8,369,378 B2 | 2/2013 | Lee et al. |
| 8,774,297 B2 | 7/2014 | Lee et al. |
| 8,774,299 B2 | 7/2014 | Lee et al. |
| 8,792,570 B2 | 7/2014 | Lee et al. |
| 2001/0005681 A1 | 6/2001 | Kim |
| 2001/0034236 A1 | 10/2001 | Tong |
| 2003/0039227 A1 | 2/2003 | Kwak |
| 2003/0133426 A1 | 7/2003 | Schein |
| 2004/0009780 A1 | 1/2004 | Dick |
| 2004/0081131 A1 | 4/2004 | Walton |
| 2004/0100896 A1 | 5/2004 | Vayanos et al. |
| 2004/0190640 A1 | 9/2004 | Dubuc |
| 2005/0083977 A1 | 4/2005 | Moulsley |
| 2005/0117536 A1 | 6/2005 | Cho |
| 2005/0122898 A1 | 6/2005 | Jang |
| 2005/0165949 A1 | 7/2005 | Teague |
| 2005/0181799 A1 | 8/2005 | Laroia et al. |
| 2005/0220000 A1 | 10/2005 | Kim |
| 2005/0232181 A1 | 10/2005 | Park |
| 2005/0233754 A1 | 10/2005 | Beale |
| 2005/0286402 A1 | 12/2005 | Byun |
| 2006/0013186 A1 | 1/2006 | Agrawal et al. |
| 2006/0045001 A1 | 3/2006 | Jalali |
| 2006/0171295 A1 | 8/2006 | Ihm et al. |
| 2006/0198294 A1 | 9/2006 | Gerlach |
| 2006/0209814 A1 | 9/2006 | Fujii |
| 2006/0250941 A1 | 11/2006 | Onggosanusi |
| 2006/0264218 A1 | 11/2006 | Zhang |
| 2006/0274842 A1 | 12/2006 | Pan |
| 2006/0280256 A1 | 12/2006 | Kwon |
| 2007/0064669 A1 | 3/2007 | Classon |
| 2007/0097915 A1 | 5/2007 | Papasakellariou |
| 2007/0097942 A1 | 5/2007 | Gorokhov et al. |
| 2007/0097981 A1 | 5/2007 | Papasakellariou |
| 2007/0110104 A1 | 5/2007 | Sartori |
| 2007/0149137 A1 | 6/2007 | Richardson |
| 2007/0183533 A1 | 8/2007 | Schmidl |
| 2007/0184849 A1 | 8/2007 | Zheng |
| 2007/0206559 A1 | 9/2007 | Cho |
| 2007/0208986 A1 | 9/2007 | Luo |
| 2007/0211667 A1 | 9/2007 | Agrawal |
| 2007/0254662 A1 | 11/2007 | Khan |
| 2007/0258373 A1 | 11/2007 | Frederiksen |
| 2007/0258540 A1 | 11/2007 | Ratasuk |
| 2008/0025247 A1 | 1/2008 | McBeath |
| 2008/0025337 A1 | 1/2008 | Smith |
| 2008/0045272 A1 | 2/2008 | Wang et al. |
| 2008/0075184 A1 | 3/2008 | Muharemovic et al. |
| 2008/0090528 A1 | 4/2008 | Malladi |
| 2008/0095106 A1 | 4/2008 | Malladi |
| 2008/0095252 A1 | 4/2008 | Kim et al. |
| 2008/0151829 A1 | 6/2008 | Khandekar et al. |
| 2008/0205348 A1 | 8/2008 | Malladi |
| 2008/0225784 A1 | 9/2008 | Tseng |
| 2008/0225791 A1 | 9/2008 | Pi |
| 2008/0227398 A1 | 9/2008 | Haghighat |
| 2008/0232307 A1 | 9/2008 | Pi |
| 2008/0253469 A1 | 10/2008 | Ma |
| 2008/0267158 A1 | 10/2008 | Zhang et al. |
| 2008/0267310 A1 | 10/2008 | Khan et al. |
| 2008/0304593 A1 | 12/2008 | Khan |
| 2008/0310483 A1 | 12/2008 | Lee |
| 2009/0046793 A1 | 2/2009 | Love |
| 2009/0059884 A1 | 3/2009 | Zhang |
| 2009/0060081 A1 | 3/2009 | Zhang et al. |
| 2009/0154580 A1 | 6/2009 | Ahn |
| 2009/0196279 A1 | 8/2009 | Kim |
| 2009/0262699 A1 | 10/2009 | Wengerter et al. |
| 2009/0274037 A1 | 11/2009 | Lee |
| 2009/0285163 A1 | 11/2009 | Zhang |
| 2009/0310719 A1 | 12/2009 | Stirling-gallacher |
| 2009/0323615 A1 | 12/2009 | Ihm |
| 2010/0034163 A1 | 2/2010 | Damnjanovic |
| 2010/0067445 A1 | 3/2010 | Rinne et al. |
| 2010/0098005 A1 | 4/2010 | Lee |
| 2010/0157913 A1 | 6/2010 | Nagata et al. |
| 2010/0167746 A1 | 7/2010 | Lee et al. |
| 2010/0260164 A1 | 10/2010 | Moon |
| 2011/0002309 A1 | 1/2011 | Park |
| 2011/0051672 A1 | 3/2011 | Lee |
| 2012/0106478 A1 | 5/2012 | Han |
| 2012/0113945 A1 | 5/2012 | Moon |

(56) References Cited

U.S. PATENT DOCUMENTS

| | | |
|---|---|---|
| 2013/0294282 A1 | 11/2013 | Seo |
| 2013/0315178 A1 | 11/2013 | Lee |

FOREIGN PATENT DOCUMENTS

| | | |
|---|---|---|
| CN | 1701550 | 11/2005 |
| CN | 1829373 | 9/2006 |
| CN | 1969522 | 5/2007 |
| CN | 101005326 | 7/2007 |
| EP | 1185001 | 3/2002 |
| EP | 1248485 | 10/2002 |
| EP | 1448012 | 8/2004 |
| EP | 1746810 | 1/2007 |
| EP | 1746855 A2 | 1/2007 |
| EP | 2056500 | 5/2009 |
| JP | 04074026 | 3/1992 |
| JP | 2001044900 | 2/2001 |
| JP | 2002369258 | 12/2002 |
| JP | 2004312291 A | 11/2004 |
| JP | 2004364321 | 12/2004 |
| JP | 2005244960 | 9/2005 |
| JP | 2005253073 | 9/2005 |
| JP | 2005288300 | 10/2005 |
| JP | 2006166382 | 6/2006 |
| JP | 2007124682 A | 5/2007 |
| JP | 2007511975 | 5/2007 |
| JP | 2007221755 | 8/2007 |
| JP | 2008053858 | 3/2008 |
| JP | 2008092051 | 4/2008 |
| JP | 2008092377 | 4/2008 |
| JP | 2008236018 | 10/2008 |
| JP | 2010506505 | 2/2010 |
| JP | 2011193521 | 9/2011 |
| KR | 1019990013366 A | 2/1999 |
| KR | 1020020009079 A | 2/2002 |
| KR | 1020020088085 | 11/2002 |
| KR | 1020030081464 | 10/2003 |
| KR | 1020050021965 | 3/2005 |
| KR | 1020050043302 A | 5/2005 |
| KR | 1020050073256 | 7/2005 |
| KR | 1020050120244 A | 12/2005 |
| KR | 1020060016600 A | 2/2006 |
| KR | 1020060081352 A | 7/2006 |
| KR | 1020060092055 A | 8/2006 |
| KR | 1020060095576 | 8/2006 |
| KR | 20070107614 A | 11/2007 |
| KR | 1020080023664 | 3/2008 |
| KR | 1020080030905 A | 4/2008 |
| KR | 1020080039772 A | 5/2008 |
| KR | 1020080065853 | 7/2008 |
| KR | 1020080096088 | 10/2008 |
| KR | 100894142 | 4/2009 |
| KR | 1020090082843 | 7/2009 |
| RU | 2142672 | 10/1999 |
| RU | 2221335 | 1/2004 |
| RU | 2267225 | 5/2005 |
| TW | 545074 | 8/2003 |
| WO | 03043245 A1 | 5/2003 |
| WO | 03077579 A1 | 9/2003 |
| WO | 03085858 | 10/2003 |
| WO | 2004038991 | 5/2004 |
| WO | 2004049591 | 6/2004 |
| WO | 2005006250 | 1/2005 |
| WO | 2005050875 | 6/2005 |
| WO | 2005060132 A1 | 6/2005 |
| WO | 2005065062 | 7/2005 |
| WO | 2005074184 A2 | 8/2005 |
| WO | 2005088869 A1 | 9/2005 |
| WO | 2005099123 | 10/2005 |
| WO | 2005119959 | 12/2005 |
| WO | 2005125140 A1 | 12/2005 |
| WO | 2006023192 A2 | 3/2006 |
| WO | 2006069299 | 6/2006 |
| WO | 2006071050 | 7/2006 |
| WO | 2006073284 | 7/2006 |
| WO | 2006102771 | 10/2006 |
| WO | 2007/011180 | 1/2007 |
| WO | 2007007380 | 1/2007 |
| WO | 2007049208 | 5/2007 |
| WO | 2007052941 A1 | 5/2007 |
| WO | 2007078146 | 7/2007 |
| WO | 2007/091836 | 8/2007 |
| WO | 2008041819 | 4/2008 |
| WO | 2008133439 | 11/2008 |
| WO | 2008153331 | 12/2008 |
| WO | 2009/041785 | 4/2009 |

OTHER PUBLICATIONS

U.S. Appl. No. 14/707,670, Office Action dated Aug. 28, 2015, 8 pages.
Motorola, "E-UTRA Downlink Control Channel Structure and TP," 3GPP TSG RAN1 #44, R1-060378, Feb. 2006, 7 pages.
Ericsson, et al., "DL Control Channel Structure," 3GPP Draft, R1-071820, Apr. 2007, 3 pages.
Panasonic, "CCE aggregation size and transport format signaling," 3GPP TSG-RAN WG1 Meeting #50, R1-073608, Aug. 2007, 8 pages.
LG Electronics, "Consideration on the amount of control channel overhead in downlink," 3GPP TSG RAN WG1 #49, R1-072353, May 2007, 5 pages.
Motorola, "Downlink Acknowledgment and Group Transmit Indicator Channels," 3GPP TSG RAN1 #45, R1-061165, May 2006, 4 pages.
Samsung, "DL ACK/NACK signalling," 3GPP RAN WG1 LTE Ad Hoc, R1-061697, Jun. 2006, 5 pages.
Via Telecom, "Hybrid CDM/TDM Structure for UL E-DCH," 3GPP TSG-RAN WG1 #38-bis, R1-041162, Sep. 2004, 3 pages.
European Patent Office Application Serial No. 07833138.6, Search Report dated Feb. 21, 2014, 10 pages.
European Patent Office Application Serial No. 07833139.4, Search Report dated Mar. 4, 2014, 7 pages.
The State Intellectual Property Office of the People's Republic of China Application Serial No. 201310126189.4, Office Action dated May 29, 2015, 5 pages.
U.S. Appl. No. 13/014,665, Final Office Action dated Sep. 10, 2014, 26 pages.
U.S. Appl. No. 14/283,997, Office Action dated Oct. 2, 2014, 6 pages.
The State Intellectual Property Office of the People's Republic of China Application Serial No. 201210477694.9, Office Action dated Oct. 10, 2014, 5 pages.
U.S. Appl. No. 13/014,665, Office Action dated Feb. 13, 2014, 18 pages.
3rd Generation Partnership Project (3GPP), '3rd Generation Partnership Project; Technical Specification Group Radio Access Network; LTE Physical Layer—General Description (Release 8)' 3GPP TS 36.201 V1.2.0, XP-050380347, Jun. 2007.
Ericsson et al., "Way Forward on Downlink Control Signaling," R1-071223, 3GPP TSG RAN WG1 Meeting #48, Feb. 2007.
ETRI: "Downlink L1/L2 control signaling", R1-070079, 3GPP TSG RAN WG1 Meeting #47bis, Jan. 2007, XP050104134.
Huawei, "E-UTRA Downlink L1/L2 Control Channel Structure," R1-071689, 3GPP TSG-RAN-WG1 Meeting #48bis, Mar. 2007.
Intel Corporation: "Text Proposal for downlink OFDMA resource allocation and mapping rules for distributed mode users in E-UTRA, with discussion on control information", R1-061149, 3GPP TSG RAN WG1 #45, May 2006, XP002486595.
Kaiser, "Space Frequency Block Coding in the Uplink of Broadband MC-CDMA Mobile Radio Systems with Pre-Equalization", Institute of Electrical and Electronics Engineers, Vehicular Technology Conference, Fall 2003, XP10701084.
Kim, I.G., et al., "Transmit Diversity and Multiplexing Methods for 3G-LTE Downlink Control Channels," 64th IEEE Vehicular Technology Conference, Sep. 2006, XP-031051218.
LG Electronics, 'Downlink CatO signaling for scheduling assignments', 3GPP TSG RAN WG1 #47bis, R1-070247, Jan. 2007.

(56) References Cited

OTHER PUBLICATIONS

LG Electronics, "DL ACK/NACK structure", R1-072878, 3GPP TSG RAN WG1 #49bis, Jun. 2007.
LG Electronics, "Downlink ACK/NACK Index Mapping", R1-071552, 3GPP RAN WG1 #48-BIS, Mar. 2007, XP-002660818.
LG Electronics, "Downlink control signaling", R1-063177, 3GPP TSG RAN WG1 #47, Nov. 2006.
LG Electronics, "Downlink resource allocation for localized and distributed transmission," R1-071549, 3GPP TSG RAN WG1 #48bis, Mar. 2007, XP-050105480.
LG Electronics, "Uplink ACK/NACK Index Mapping", R1-071547, 3GPP RAN WG1 #48-BIS, Mar. 2007, XP-002660822.
Morimoto et al., "Transmit Diversity Schemes Suitable for Common Control Channel in Evolved UTRA Downlink", RCS2007-50, IEICE Technical Report, pp. 125-130, Jul. 2007.
NEC Group, "Efficient Downlink ACK/NACK signalling for E-UTRA," R1-071508, TSG-RAN WG1#48Bis, Mar. 2007.
Nortel, "Discussion on linkage of PHICH to uplink transmissions", R1-080771, 3GPP TSG-RAN WG1 Meeting #52, Feb. 2007.
Nortel, "SCH Search Performance with Transmit Diversity", R1-061843, 3GPP TSG-RAN Working Group 1 Meeting on LTE, Jun. 2006.
NTT DoCoMo, et al., "RB-level Distributed Transmission Method for Shared Data Channel in E-UTRA Downlink", 3GPP TSG RAN WG1 Meeting #46, R1-062285, Aug. 2006.
NTT DoCoMo et al., "Coding Scheme of L1/L2 Control Channel for E-UTRA Downlink", R1-061672, 3GPP TSG RAN WG1 LTE Ad Hoc, Jun. 2006.
NTT DoCoMo et al., "Comparison between RB-level and Sub-carrier-level Distributed Transmission for Shared Data Channel in E-UTRA Downlink", R1-062089, 3GPP TSG RAN WG1 Meeting #46, Sep. 2006.
NTT DoCoMo et al., "Downlink L1/L2 Control Signaling Channel Structure Mapping," R1-070104, 3GPP TSG RAN WG Meeting #47bis, Jan. 2007.
Panasonic, "Assignment of Downlink ACK/NACK channel", R1-072794, 3GPP TSG-RAN WG1 Meeting #49bis, Jun. 2007, XP-002660823.
Panasonic, "Mapping Positions of Control Channel for Uplink SC-FDMA", TSG-RAN WG1 #43, XP-002450961, Nov. 7, 2005.
Qualcomm Europe, "Considerations on Multiplexing of Control and User Data for xFDMA based E-UTRA Uplink Evaluation", R1-051102, 3GPP TSG-RAN WG1 #42bis, Oct. 2005, XP-002446638.
Qualcomm Europe, 'Further Details on RACH Procedure,' R1-070649, 3GPP TSG-RAN WG1 #48, Feb. 2007.
Ryu, H.G., "System Design and Analysis of MIMO SFBC CI-OFDM System against the Nonlinear Distortion and Narrowband Interference," IEEE Transactions on Consumer Electronics, vol. 54, No. 2, pp. 368-375, May 2008.
Ryu, H.G., et al., "Design and Performance Evaluation of the MIMO SFBC CI-OFDM Communication System," The Fourth International Conference on Wireless and Mobile Communications, pp. 60-64, Jul. 2008.
Samsung, "Downlink ACK/NACK Transmission Structure", R1-072247, 3GPP TSG RAN WG1 Meeting #49, May 2007.
Samsung, "Performance of 4-Tx Antenna diversity with realistic channel estimation", R1-072239, 3GPP TSG RAN WG1 Meeting #49, May 2007.
Samsung, "Transmit Diversity for 4-Tx Antenna", 3GPP TSG RAN WG1 Meeting #49, R1-072238, May 7, 2007, XP-002578959.
Sharp, "UE Identity in L1/L2 Downlink Control Signalling", R1-061136, 3GPP TSG-RAN WG1#45, May 2006.
Su, W., et al., "Obtaining full-diversity space-frequency codes from space-time codes via mapping," IEEE Transactions on Signal Processing, vol. 51, No. 11, pp. 2903-2916, Nov. 1, 2003; XP-011102805.
Taiwan Intellectual Property Office Application Serial No. 096136988, Office Action dated May 17, 2013, 6 pages.
Texas Instruments, "Shared Control Channel Structure and Coding for E-UTRA Downlink", 3GPP TSG RAN WG1 LTE Ad Hoc, R1-061740, Jun. 2006.
Texas Instruments, "Shared Control Channel Structure for E-UTRA Downlink", 3GPP TSG RAN WG1#45, R1-061433, May 2006.
U.S. Appl. No. 13/014,665, Final Office Action dated May 22, 2013, 25 pages.
U.S. Appl. No. 13/014,665, Office Action dated Nov. 29, 2012, 24 pages.
U.S. Appl. No. 13/165,711, Office Action dated Mar. 13, 2013, 10 pages.
U.S. Appl. No. 13/217,204, Notice of Allowance dated Apr. 8, 2013, 8 pages.
U.S. Appl. No. 13/295,884, Office Action dated Mar. 14, 2013, 8 pages.
U.S. Appl. No. 13/295,974, Office Action dated Jan. 29, 2013, 8 pages.
U.S. Appl. No. 13/295,987, Office Action dated Feb. 6, 2013, 8 pages.
Zhang, M., et al., "Space-Frequency Block Code with Matched Rotation MIMO-OFDM System with Limited Feedback", EURASIP Journal on Advances in Signal Processing, Jun. 24, 2009.
Zhang, W., et al., "Space-Time/Frequency Coding for MIMO-OFDM in Next Generation Broadband Wireless Systems," Next-Generation CDMA vs. OFDMA for 4G Wireless Applications, IEEE Wireless Communications, vol. 14, No. 3, pp. 32-43, Jun. 2007, XP-011189164.
Zhang, W., et al., "Universal Space-Frequency Block Coding for MIMO-OFDM Systems", IEEE Asia-Pacific Conference on Communications, pp. 227-231, Oct. 5, 2005.
U.S. Appl. No. 13/165,711, Final Office Action dated Aug. 9, 2013, 9 pages.
The State Intellectual Property Office of the People's Republic of China Application Serial No. 201310068333.3, Office Action dated May 12, 2015, 5 pages.
Intellectual Property Office of India Application Serial No. 5825/CHENP/2009, Office Action dated Dec. 12, 2014, 1 page.
Samsung, "Rules for mapping VRBs to PRBs," 3GPP RAN WG1 Meeting #44bis, R1-060808, Mar. 2006, 5 pages.
Ericsson, et al., "E-UTRA Downlink Control Signaling—Overhead Assessment," TSG-RAN WG1 #44, R1-060573, Feb. 2006, 7 pages.
European Patent Office Application Serial No. 13185491.1, Search Report dated Nov. 7, 2013, 8 pages.
Gessner, et al., "Rohde & Schwarz: Application Note UMTS Long Term Evolution (LTE)—Technology Introduction," Jul. 2012, 115 pages.
U.S. Appl. No. 14/333,240, Office Action dated Nov. 20, 2015, 15 pages.
U.S. Appl. No. 14/684,747, Office Action dated Nov. 30, 2015, 17 pages.
U.S. Appl. No. 14/754,026, Office Action dated Dec. 4, 2015, 28 pages.
NTT DoCoMo, et al., "ACK/NACK Signal Structure in E-UTRA Downlink," 3GPP TSG RAN WG1 Meeting #48, R1-070867, Feb. 2007, 3 pages.
LG Electronics, "Allocation of UL ACK/NACK index," 3GPP TSG RAN WG1 #49, R1-072348, May 2007, 4 pages.
European Patent Office Application Serial No. 14152103.9, Search Report dated Mar. 6, 2014, 7 pages.
U.S. Appl. No. 14/701,077, Notice of Allowance dated Jul. 31, 2015, 8 pages.
U.S. Appl. No. 14/303,482, Office Action dated Apr. 15, 2015, 17 pages.

RESOURCE ALLOCATION METHOD AND A METHOD FOR TRANSMITTING/RECEIVING RESOURCE ALLOCATION INFORMATION IN MOBILE COMMUNICATION SYSTEM

CROSS-REFERENCE TO RELATED APPLICATIONS

This application is a continuation of U.S. patent application Ser. No. 14/515,320, filed on Oct. 15, 2014, now U.S. Pat. No. 9,191,173, which is a continuation of U.S. patent application Ser. No. 14/306,040, filed on Jun. 16, 2014, now U.S. Pat. No. 8,923,241, which is a continuation of U.S. patent application Ser. No. 13/958,388, filed on Aug. 2, 2013, now U.S. Pat. No. 8,787,297, which is a continuation of U.S. patent application Ser. No. 12/523,696, filed on Jul. 17, 2009, now U.S. Pat. No. 8,630,242, which is the National Stage filing under 35 U.S.C. 371 of International Application No. PCT/KR2008/001546, filed on Mar. 19, 2008, which claims the benefit of earlier filing date and right of priority to Korean Patent Application Nos. 10-2008-0025480, filed on Mar. 19, 2008, and 10-2007-0089202, filed on Sep. 3, 2007, and also claims the benefit of U.S. Provisional Application Nos. 60/895,709, filed on Mar. 19, 2007, 60/915,099, filed on Apr. 30, 2007, 60/945,585, filed on Jun. 21, 2007, and 60/978,398, filed on Oct. 8, 2007, the contents of which are all hereby incorporated by reference herein in their entirety.

TECHNICAL FIELD

The present invention relates to a mobile communication system, and more particularly to a resource allocation method and a method for transmitting/receiving resource allocation information in a mobile communication system.

BACKGROUND ART

In a mobile communication system, a scheduling method for data transmission, that is, a resource allocation method is divided into a frequency diversity scheduling (FDS) method for obtaining a reception capability gain using frequency diversity and a frequency selective scheduling (FSS) method for obtaining a reception capability gain using frequency selective scheduling.

In the FDS method, a transmitter transmits a data packet via subcarriers, which are widely distributed in a system frequency domain, such that symbols within the data packet are subjected to a variety of radio channel fading. Accordingly, the whole data packet is prevented from being subjected to disadvantageous fading and thus reception capability is improved.

In contrast, in the FSS method, a data packet is transmitted via one or a plurality of consecutive frequency domains, which is in an advantageous fading state, in a system frequency domain such that reception capability is improved.

Actually, in a cellular OFDM radio packet communication system, a plurality of user equipments exist in a cell and radio channel states of the user equipments have different characteristics. Accordingly, even in a subframe, data transmission using the FDS method needs to be performed with respect to any user equipment and data transmission using the FSS method needs to be performed with respect to the other user equipments. Accordingly, it is preferable that the FDS transmission method and the FSS transmission method are efficiently multiplexed in the subframe.

DISCLOSURE OF INVENTION

Accordingly, the present invention is directed to a resource allocation method and a method for transmitting/receiving resource allocation information in a mobile communication system that substantially obviate one or more problems due to limitations and disadvantages of the related art.

An object of the present invention devised to solve the problem lies on an efficient resource allocation method.

Another object of the present invention devised to solve the problem lies on a method for transmitting resource allocation information according to an efficient resource allocation method.

The object of the present invention can be achieved by providing a method for receiving resource allocation information in mobile communication system, the method including: receiving first information which indicates a resource block group set and second information which is a bitmap indicating whether or not to allocate resource block included in the resource block group set via a control channel; identifying allocated resource block from the first information and the second information; and receiving data using the allocated resource block.

The first information may indicate one among one or more resource block group set.

The resource block group set may include one or more resource block group.

The resource block group may include one or more consecutive resource block according to the number of resource blocks included in a subframe.

The number of the resource block group set may correspond with the number of resource block included in the resource block group.

The number of resource blocks included in the resource block group set may correspond with the number of resource block group.

In another aspect of the present invention, provided herein is a method for transmitting resource allocation information in mobile communication system, the method including: constructing a control channel including first information which indicates resource allocation type and second information which is a bitmap indicating whether or not to allocate at least part of resource blocks included in a subframe according to the resource allocation type; transmitting the control channel to a scheduled User Equipment; and transmitting data associated with the control channel to the scheduled User Equipment.

The resource allocation type may indicate at least one of a group scheduling type and a part-bitmap scheduling type.

The bitmap may indicate a resource block that is allocated to the scheduled User Equipment among one or more resource block included in a resource block group set, in a case that the resource allocation type is the part-bitmap scheduling type.

The resource block group set may include one or more resource block group.

The resource block group may include one or more consecutive resource block.

The control channel may further include third information which indicates one among one or more resource block group set.

The bitmap may indicate a resource block group that is allocated to the scheduled User Equipment, in a case that the resource allocation type is the group scheduling type.

In another aspect of the present invention, provided herein is a method for receiving resource allocation information in mobile communication system, the method including: receiving information of virtual resource block which comprises a part of each of one or more resource block in a subframe; identifying allocated resource block from the information of virtual resource block; and receiving data using at least part of the allocated resource block according to the information of virtual resource block.

The information of virtual resource block may include information of the one or more resource block and information which indicates one or more among one or more virtual resource block comprised by the one or more resource block.

The information of virtual resource block may include information of the number of the one or more resource block and information of the number of one or more virtual resource block comprised by the one or more resource block and information which indicates one or more among the one or more virtual resource block.

ADVANTAGEOUS EFFECTS

By applying a radio resource allocation method and the construction and the transmission/reception method of resource allocation information disclosed in the present specification, a FSS method and a FDS method are efficiently combined so as to perform scheduling.

By applying the radio resource allocation method and the construction and the transmission method of the resource allocation information disclosed in the present specification, it is possible to reduce the number of bits for transmitting the resource allocation information.

In addition, by using a DVRB construction method disclosed in the present specification, it is possible to randomize interference between cells for transmission of data to user equipments so as to optimize system efficiency.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
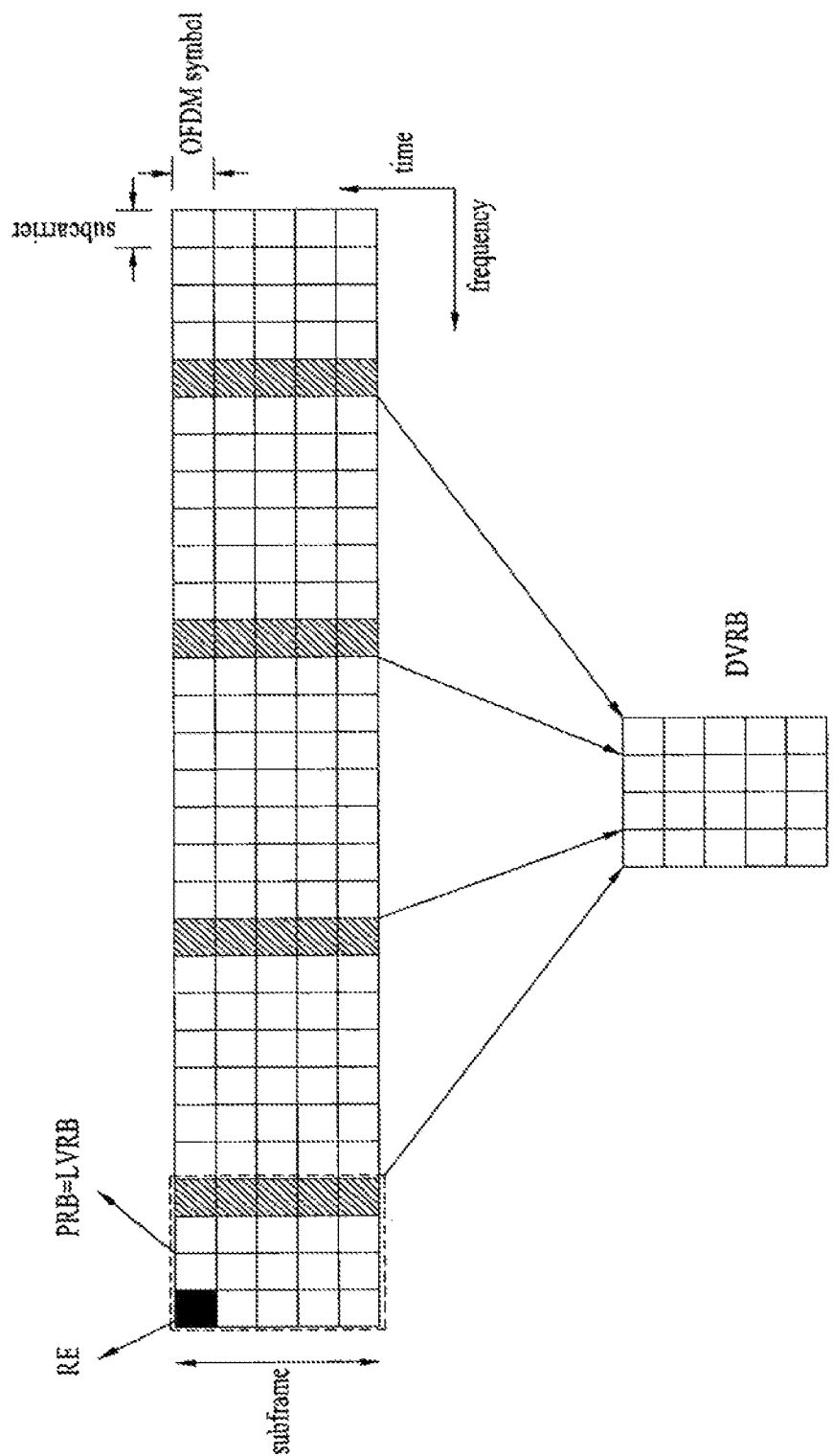
FIG. 1 is a view illustrating a scheduling resource block unit.

FIG. 1 is a view illustrating a scheduling resource block unit.

In a mobile communication system, an uplink/downlink data packet is transmitted in the unit of a subframe and a subframe may be defined by a predetermined time period including a plurality of OFDM symbols. In the present specification, the following terms are defined for convenience of description of technology.

A resource element (RE) is a smallest frequency-time unit in which a modulation symbol of data or control channel is mapped. If a signal is transmitted via M subcarriers in an OFDM symbol and N OFDM symbols in a subframe, M×N REs may exist in the subframe.

A physical resource block (PRB) is a frequency-time resource unit for transmitting data. In general, a PRB is composed of consecutive RES in a frequency-time domain and a plurality of PRBs are defined in a subframe.

A virtual resource block (VRB) is a virtual resource unit for transmitting data. In general, the number of RBs included in a VRB is equal to the number of REs included in a PRB. In actual data transmission, a VRB may be mapped to a PRB or a VRB may be mapped to parts of a plurality of PRBs.

A localized virtual resource block (LVRB) is a type of VRB. A LVRB is mapped to a PRB, and PRBs to which different LVRBs are not mapped to a same PRB. The LVRB may be interpreted as the PRB. Here, a PRB to which the LVRB is mapped may be called a PRB for a LVRB.

A distributed virtual resource block (DVRB) is a type of the VRB. A DVRB is mapped to some REs in a plurality of PRBs, and different DVRBs are not mapped to same REs. Here, a PRB used for a DVRB construction may be called a PRB for DVRB.

A base station performs scheduling for transmission of downlink data to a specific user equipment or transmission of uplink data from the specific user equipment to the base station via one or a plurality of VRBs in a subframe. At this time, the base station should inform the user equipment of information indicating via which downlink VRB the data is transmitted when the downlink data is transmitted to the specific user equipment and inform the user equipment of information indicating via which uplink VRB the data can be transmitted in order to allow the specific user equipment to transmit the uplink data.

In an actual system, data transmission using the LVRB and data transmission using the DVRB may be made together in a subframe. At this time, in order to prevent the data transmission using the LVRB and the data transmission using the DVRB from colliding in the same RE, it is preferable that the data transmission using the DVRB and the data transmission using the LVRB use different PRBs in a subframe.

In other words, the PRBs in the subframe may be divided into PRBs for the LVRB and PRBs for the DVRB as described above. In the case that the data transmission using the LVRB and the data transmission using the DVRB are made together in a subframe, the specific user equipment may be informed of whether the VRB used for transmission/reception of the uplink/downlink data is the LVRB or the DVRB.

Hereinafter, first, a data transmission method using a LVRB and a method for transmitting scheduling information will be described.

If $N_{LVRB}$ LVRBs exist in a subframe, a base station performs uplink/downlink scheduling according to the data transmission method using the LVRB by using the $N_{LVRB}$ LVRBs with respect to at least one user equipment.

Then, $N_{LVRB}$-bit bitmap information is transmitted to the user equipment so as to inform the user equipment of information indicating via which LVRB the downlink data is transmitted or information indicating via which LVRB the uplink data can be transmitted. That is, each bit in the $N_{LVRB}$-bit bitmap information represents data transmission information with respect to each of the $N_{LVRB}$ LVRBs.

For example, in the $N_{LVRB}$-bit bitmap information, with respect to the LVRB used for transmission/reception of the uplink/downlink data to/from the user equipment, a bit for the LVRB is set to 1 and, with respect to the LVRB which is not used for transmission/reception of the uplink/downlink data to/from the user equipment, a bit for the LVRB is set to 0. The user equipment which receives the $N_{LVRB}$-bit bitmap information constructed by this method can receive the downlink data or transmit the uplink data using the LVRB which is set to 1 in the $N_{LVRB}$-bit bitmap information.

Figure 2:
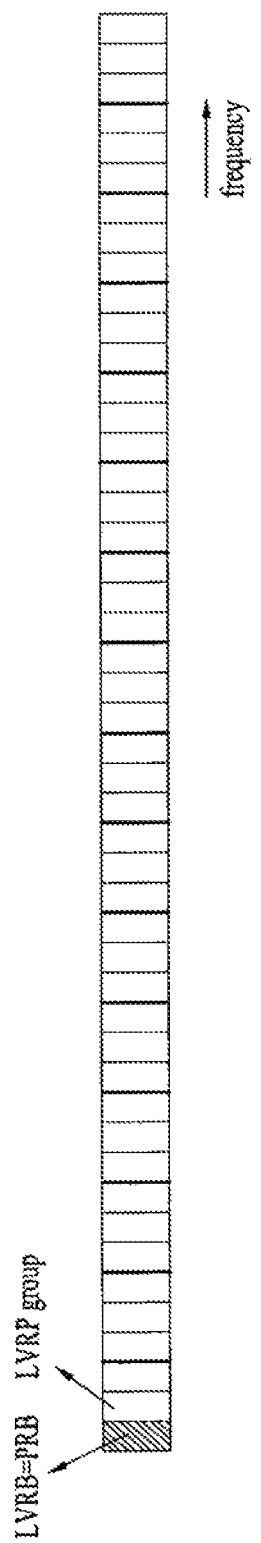
FIG. 2 is a view illustrating an example of a group scheduling method using a localized virtual resource block (LVRB)

FIG. 2 is a view illustrating an example of a group scheduling method using a LVRB.

In a case that the number of LVRBs which exist in a subframe is large, the base station uses too many downlink resources for informing the user equipment of the $N_{LVRB}$-bits bitmap information. At this time, $N_{LVRB}$ LVRBs are divided into $N_{group}$ LVRB groups such that data is transmitted/received in the unit of a LVRB group. Thus, it is possible to reduce number of downlink resources which are used at the time of the transmission of the bitmap information.

That is, in the transmission of the data in the unit of the LVRB group, the base station informs the user equipment of the $N_{group}$-bit bitmap information of the $N_{group}$ LVRB groups instead of the $N_{LVRB}$-bit bitmap information of the LVRBs ($N_{group} < N_{LVRB}$).

In addition, if the LVRB is used for transmitting/receiving the data by the PSS method, it is advantageous that the data is transmitted using consecutive subcarriers in a frequency domain in the FSS method. Accordingly, each of the LVRB groups is composed of consecutive PRBs in the frequency domain. This method is called a group scheduling method in the present invention.

In FIG. 2, a subframe is composed of 48 PRBs and each PRB is mapped to a LVRB. At this time, three LVRBs are combined to construct a LVRB group such that 16 LVRB groups exist in the subframe. Accordingly, the base station informs a specific user equipment of an area in which downlink data is transmitted to the specific user equipment or an area in which the specific user equipment can transmit uplink data, via 16-bit bitmap information.

However, if the data is transmitted in the unit of the LVRB group, $N_{group}$ LVRBs are used for even transmission of a small amount of data such that a frequency-time resource is wasted. If consecutive $N_{group}$ LVRBs in the frequency domain become a basic data transmission unit, it is difficult to efficiently perform data transmission using the FDS method.

Accordingly, in the present embodiment, in order to reduce the resources necessary for informing the user equipment of the LVRB via which the data is transmitted while the data can be transmitted in the unit of the LVRB instead of the unit of the LVRB group, a method for informing the user equipment whether or not the data can be transmitted via the LVRBs, via the LVRB-unit bitmap information only with respect to a part of all the LVRBs in the subframe is suggested.

The user equipment which is allocated with the LVRB for transmission/reception of the data can transmit/receive the data via the LVRBs belonging to a LVRB set with respect to a subframe. This method is called a part-bitmap scheduling method in the present invention.

Figure 3:
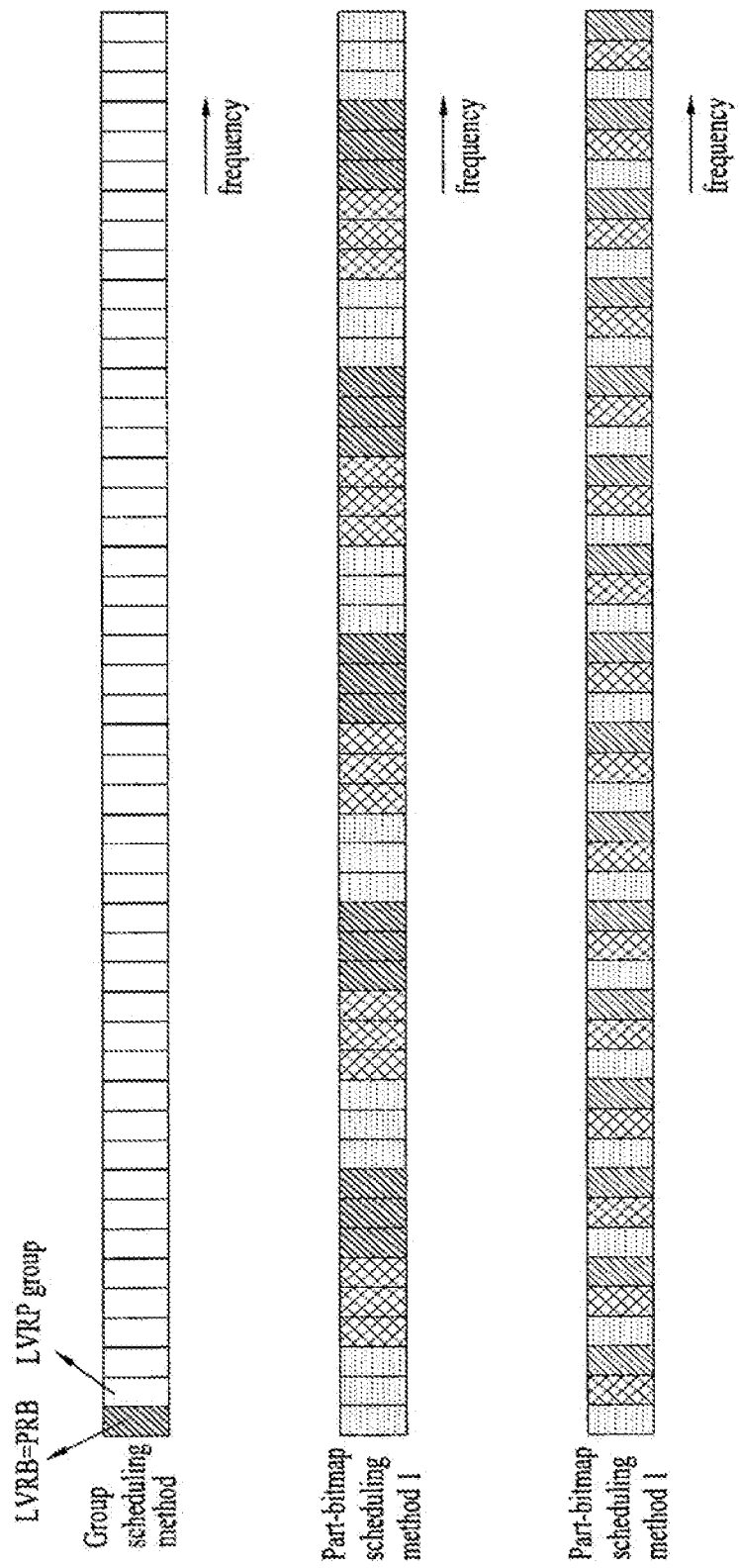
FIG. 3 is a view illustrating an example of a part-bitmap scheduling method using a LVRB according to an embodiment of the present invention.

FIG. 3 is a view illustrating an example of a part-bitmap scheduling method using a LVRB according to an embodiment of the present invention.

In the present embodiment, when $N_{LVRB}$ LVRBs exist in a subframe, a part of all the LVRBs in the subframe is defined as a LVRB set. In other words, $N_{LVRB\_part}$ LVRB sets ($N_{LVRB\_part} < N_{LVRB}$) are previously defined.

Here, the LVRB set may be constructed by various methods. At an upper side of FIG. 3, a LVRB group or a LVRB set may be defined in association with a set construction method and a group construction method for applying the group scheduling method shown as an example. If the LVRB set is defined in consideration of the LVRB group construction method for applying the group scheduling method, the group scheduling method and the part-bitmap scheduling method can be used to be compatible with each other. Thus, flexible scheduling is possible. Hereinafter, two methods for constructing the LVRB set in consideration of the LVRB group construction method will be described as embodiments.

In a first method, like the part-bitmap scheduling method 1 of FIG. 3, a LVRB set is defined so as to include a plurality of LVRB groups used for the group scheduling method, and more particularly, inconsecutive LVRB groups in the frequency domain. According to this method, a plurality of LVRBs in the LVRB group may be allocated to a user equipment. Accordingly, all the LVRBs in the LVRB group can be used by the part-bitmap scheduling for a small number of user equipments.

In a second method, a LVRB set is composed of LVRBs which are separated from each other at a predetermined PRE interval in the frequency domain. Like the part-bitmap scheduling method 2 of FIG. 3, a LVRB set may be constructed so as to include a LVRB belonging to each LVRB group. This method is advantageous in that, when the part-bitmap scheduling method is used for the data transmission using the FDS method, the data can be transmitted/received to/from a user equipment by only the LVRBs which are separated from each other in the frequency domain.

In the part-bitmap scheduling method, the LVRB sets may be constructed by the two above-described methods, which are only exemplary. The LVRB sets may be constructed by various methods.

Figure 4:
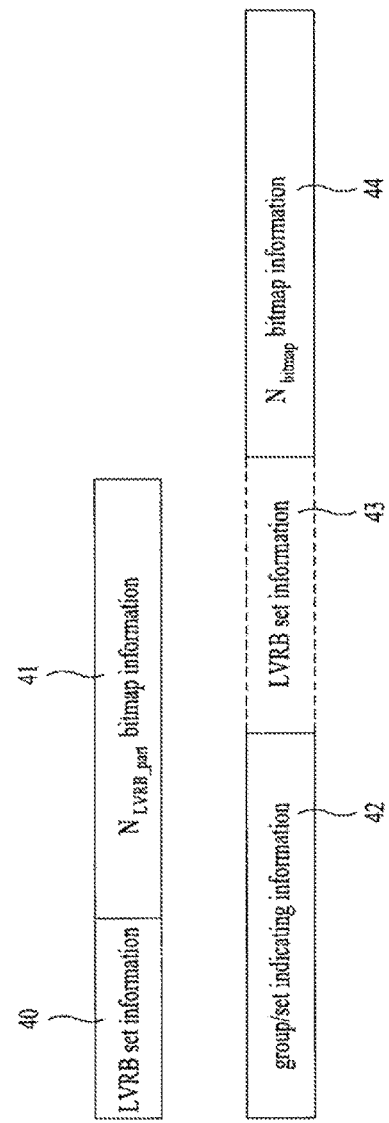
FIG. 4 is a view illustrating an example of a part-bitmap scheduling information construction method using a LVRB according to an embodiment of the present invention.

FIG. 4 is a view illustrating an example of a part-bitmap scheduling information construction method using a LVRB according to an embodiment of the present invention.

The scheduling information construction examples shown in FIG. 4 represent a scheduling information construction of a user equipment and more particularly a scheduling information construction which can be transmitted to a user equipment which is scheduled using the LVRB.

In the present embodiment, as described above, it is assumed that, when $N_{LVRB}$ LVRBs exist in a subframe, a part of all the LVRBs in a subframe are defined as a LVRB set.

At an upper side of FIG. 4, a scheduling information construction method when the LVRB set is defined so as to perform scheduling is shown. As shown at the upper side of FIG. 4, the base station may inform the user equipments of information indicating via which LVRB the user equipments receive or transmit the data, using LVRB set information 40 indicating to which LVRB set a bitmap corresponds and $N_{LVRB\_part}$-bit bitmap information 41 indicating whether or not data can be transmitted via the LVRBs in the LVRB set.

It is assumed that the user equipment which receives scheduling information knows that the LVRB is allocated via broadcasting information or scheduling information. Accordingly, the scheduling information shown at the upper side of FIG. 4 is received such that it can be checked in which set an available LVRB is included, using the LVRB set information 40. Subsequently, the $N_{LVRB\_part}$-bit bitmap 41 is received such that it can be checked which LVRB in the set checked via the LVRB set information 40 is available.

At a lower side of FIG. 4, as described above, the scheduling information construction method when a LVRB group and a LVRB set are associated with each other such that the group scheduling method and the part-bitmap scheduling method can be used to be compatible with each other is shown.

As shown at the lower side of FIG. 4, the base station informs the user equipments of information indicating via which LVRB the user equipments receive or transmit the data, via group/set indicating information 42 indicating whether bitmap information is bitmap information for the LVRB group or bitmap information for LVRB set, LVRB set information 43 indicating to which LVRB set the bitmap corresponds when the bitmap information is the bitmap information for the LVRB set, and $N_{bitmap}$-bit bitmap information 44 indicating whether or not data for the LVRB group can be transmitted or whether or not data for LVRBs in the LVRB set can be transmitted.

It is assumed that the user equipment which receives the scheduling information knows that the LVRB is allocated via broadcasting information or scheduling information. The user equipment receives the scheduling information shown at the lower side of FIG. 4 so as to check whether subsequent bitmap information is bitmap information for the LVRB group or bitmap information for the LVRBs in the set via the group/set indicating information.

If the group/set indicating information 42 indicates the set, it can be checked which set an available LVRB is included via the LVRB set information 43. Subsequently, the $N_{bitmap}$-bit bitmap information 44 is received such that it can be checked which LVRB in the set checked via the LVRB set information 43 is available. Similarly, if the group/set indicating information 42 indicates the group, it can be checked which LVRB is available via the $N_{bitmap}$-bit bitmap information 44.

As another embodiment of the case where the group scheduling method and the part-bitmap scheduling method can be used to be compatible with each other, as shown at the lower side of FIG. 4, the group/set indicating information 42 are not transmitted as separate bit information and may be transmitted as an element of the LVRB set information 40 described with reference to the embodiment shown at the upper side of FIG. 4. For example, if three LVRB sets exist, 00 indicates that the bitmap information is the bitmap information for the LVRB group and 01, 10 and 11 are set to indicate the LVRB set information such that it is indicated that the bitmap information is the bitmap information for the LVRB set. That is, 01, 10 and 11 may be set to indicate the LVRB set 1, the LVRB set 2 and the LVRB set 3, respectively.

As described above, if the LVRB group and the LVRB set are associated with each other, it is possible to freely allocate data. In particular, at this time, it is preferable that $N_{bitmap}=N_{LVRB\_part}=N_{group}$ is satisfied. If $N_{bitmap}=N_{LVRB\_part}=N_{group}$ is satisfied, bitmap information having a predetermined or fixed size may be used.

Among the data transmission methods, in the FSS method, since the data is transmitted using the consecutive subcarriers in the frequency domain, it is more efficient that the data is transmitted using the LVRB. If the present embodiment is used, the amount of scheduling information can be reduced and scheduling can be performed by a combination of the FSS method and the FDS method. Accordingly, a transmission resource can be more efficiently used.

Up to now, the data transmission method using the LVRB and the method for transmitting the scheduling information were described.

Hereinafter, the data transmission method using the DVRB and the method for transmitting the scheduling information will be described.

The data transmission using the FDS method via a small number of VRBs cannot be efficiently performed by the group scheduling method or the part-bitmap scheduling method. For example, in a case where the part-bitmap scheduling method is applied when a data packet is transmitted via a VRB, the data packet can be transmitted via only a single LVRB. Accordingly, the data packet is transmitted by the consecutive subcarriers in the frequency domain such that a frequency diversity gain cannot be obtained. Thus, in the present embodiment, two methods for efficiently performing the data transmission using the FDS method are suggested.

Figure 5:
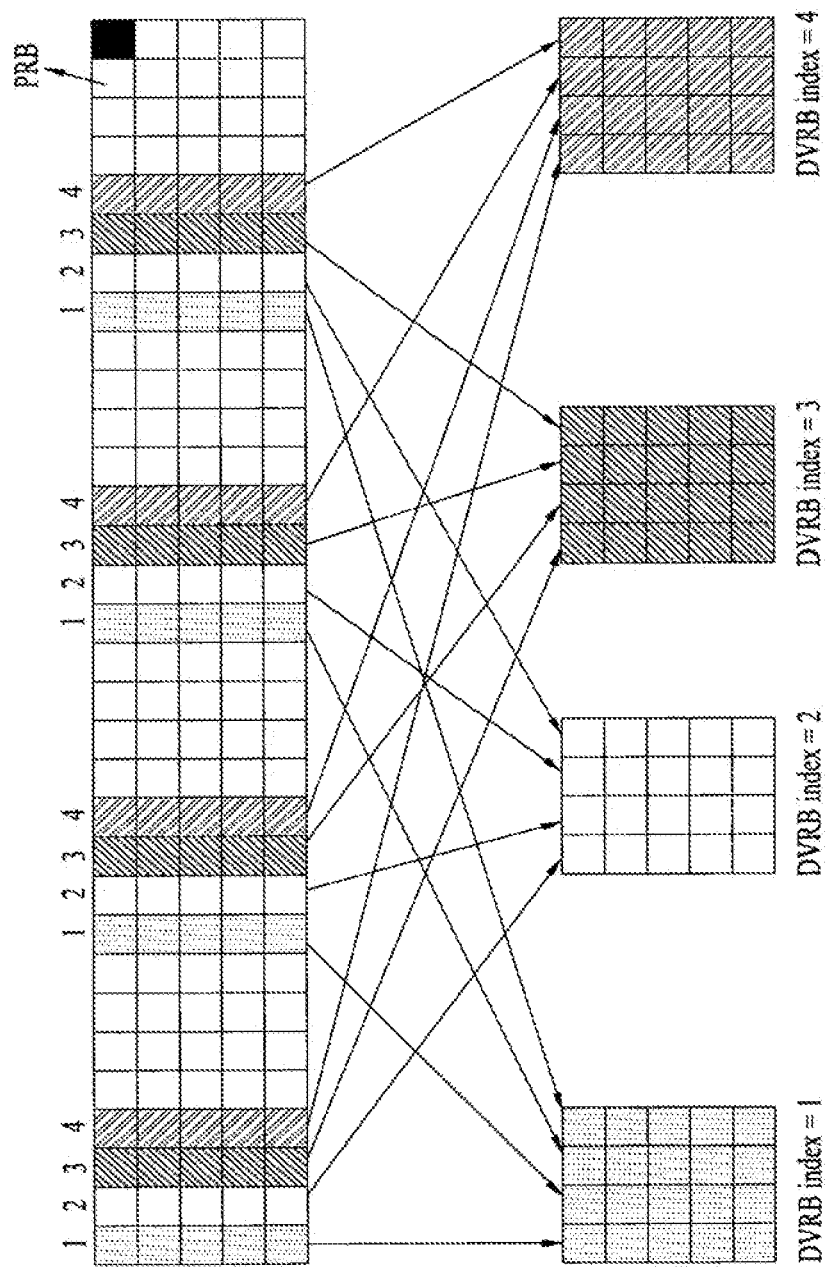
FIG. 5 is a view illustrating an example of a method for constructing a distributed virtual resource block (DVRB) according to an embodiment of the present invention.

FIG. 5 is a view illustrating an example of a method for constructing a DVRB according to an embodiment of the present invention.

In the present embodiment, REs included in $N_{DVRB}$ PRBs for the DVRB are combined so as to construct $N_{DVRB}$ DVRBs. In this method, a DVRB is constructed so as to include a specific amount of REs in each PRB belonging to $N_{DVRB}$ PRBs. FIG. 5 shows an example of combining REs included in four PRBs for the DVRB so as to construct four DVRBs. That is, in FIG. 5, a DVRB is constructed so as to include five REs in each PRB belonging to four PRBs for the DVRB.

At this time, when the data packet is transmitted via one or a plurality of DVRBs, a frequency diversity gain can be obtained. The base station can combine a predetermined number of PRBs and construct a DVRB via which data can be transmitted/received to/from a specific user equipment, for the FDS transmission/reception method. The user equipments may be Informed of the PRB for the DVRB which will be used for data transmission/reception using the DVRB, how the DVRBs are constructed in the PRBs for the DVRB, and via which of DVRBs the data is transmitted/received.

Figure 6:
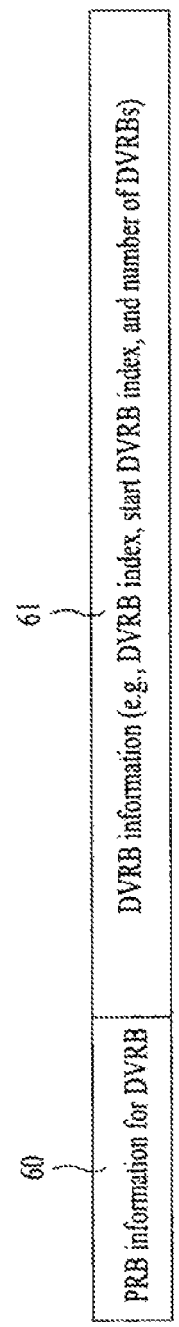
FIG. 6 is a view illustrating an example of a scheduling information construction method with respect to scheduling using a DVRB according to an embodiment of the present invention.

FIG. 6 is a view illustrating an example of a scheduling information construction method with respect to scheduling using a DVRB according to an embodiment of the present invention.

As described with reference to FIG. 5, scheduling information, which can be transmitted from the base station when a method for combining REs included in $N_{DVRB}$ PRBs for the DVRB so as to construct the $N_{DVRB}$ DVRBs is used, will be described. In this case, in the present invention, when the base station transmits/receives the data to/from any user equipment via the DVRB in any subframe, a method for informing the user equipment of the following information is suggested. That is, FIG. 6 shows scheduling information of a user equipment.

First, the user equipment is informed of PRB information for the DVRB 60 including the REs constructing the DVRB via which the data is transmitted/received to/from the user equipment. For example, the PRB information for the DVRB 60 may become index information of PRBs or bitmap information for identifying the PRBs.

The base station may indirectly inform the user equipment how the DVRBs are constructed via the PRB information for the DVRB 60 including the REs constructing the DVRB. For example, if the base station informs the user equipment of three PRBs used for transmission/reception of the data to/from the user equipment, the user equipment estimates that the RBs in each PRB are divided into three groups and three DVRBs to which a RE group is mapped are defined in three PRBs.

In particular, it is assumed that, when the indexes of the PRBs are informed, $N_{max}$ PRBs can be used in the DVRB construction as a maximum. At this time, if $N_{used}$ (smaller than $N_{max}$) PRBs are used, the indexes of the PRBs actually used are repeatedly placed at the remaining PRB index bits excluding bits indicating the indexes of the $N_{used}$ PRBs. If the indexes of the PRBs actually used are repeatedly informed using the remaining bits, the user equipment may be informed of how many PRBs are used without separate information.

In other words, although the base station does not inform the user equipment of information indicating how many PRBs are used, the user equipment can estimate how many PRBs are used. For example, if the repeated indexes of the PRBs are not present, it may be estimated that $N_{max}$ PRBs are used. It the repeated indexes of the PRBs are present, it is checked whether the indexes of $N_{repeat}$ PRBs are repeated such that it is estimated that $N_{used}$ PRBs are actually used by $N_{used} = N_{max} - N_{repeat}$.

In more detail, the indexes of the PRBs actually used are collectively placed at $N_{used}$ PRB index bits in a start part or an end part of the PRB information for the DVRB 60. If the indexes of the PRBs actually used are collectively transmitted to the start part or the end part of the PRB information 60, the receiver easily distinguishes between the indexes of the PRBs actually used and the indexes of the repeated PRBs such that the scheduling information can be more efficiently transmitted/received.

In addition, in a case that the bitmap information or the indexes of the PRBs for the DVRB which will be used for the DVRB transmission is informed, the bitmap information or the indexes of the PRBs which is constructed with respect to some PRB sets may be informed instead of the bitmap or the indexes of all the PRBs which exist in a system band, in order to reduce a necessary bit number.

In other words, if the indexes of the PRBs are informed, the indexes allocated to the PRBs for the DVRB belonging to a specific set or group among the PRBs used in the DVRB construction or the PRBs for the DVRB used in the DVRB construction may be informed, instead of the indexes allocated to all the PRBs included in a subframe.

Even when the bitmap information is informed, the indexes allocated to the PRBs for the DVRB belonging to a specific set or group among the PRBs used in the DVRB construction or the PRBs for the DVRB used in the DVRB construction may be informed, instead of the indexes allocated to all the PRBs included in a subframe.

Figure 7:
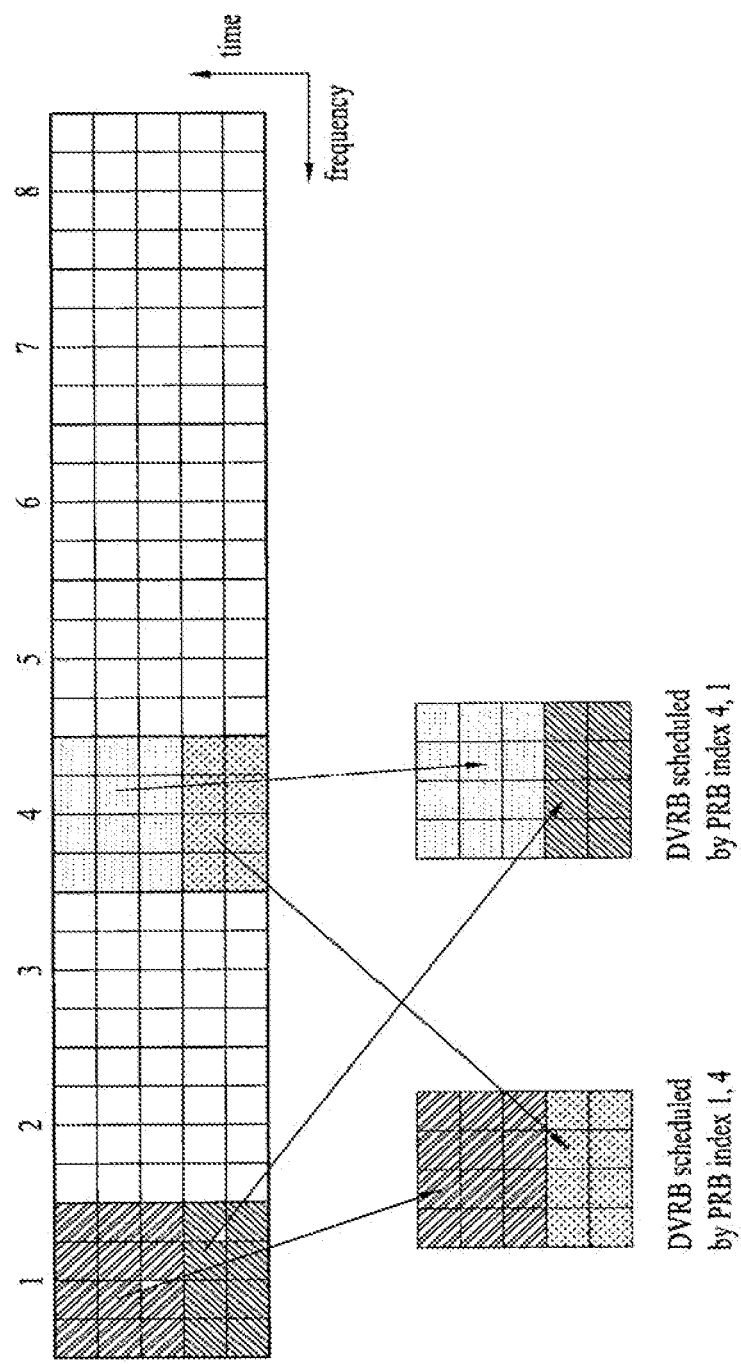
FIG. 7 is a view illustrating an example of a scheduling information construction method with respect to scheduling using a DVRB according to an embodiment of the present invention.

FIG. 7 is a view illustrating an example of a scheduling information construction method with respect to scheduling using a DVRB according to an embodiment of the present invention.

In particular, in a case that the indexes of the PRBs constructing a DVRB (or information of any format, which can sequentially indicate the indexes of the PRBs) are informed, the user equipment may be informed of which part of the PRBs is actually allocated to the user equipment via a sequence indicating a PRB index in a scheduling command transmitted to the user equipment.

For example, as shown in FIG. 7, in a case of $N_D=2$, the PRBs are divided into two groups in view of time and the two groups are allocated to different DVRBs. A rule that the index of a first PRB group transmitted via a scheduling command indicates an early (or late) part and the index of a second PRB group indicates a late (or early) part in view of time may be decided.

Similarly, even when the PRBs are divided into two groups in view of the frequency or the like, a predefined sequence of parts of a PRB may be mapped to a PRB index sequence of the scheduling command. This is applicable to a case that $N_D$ is larger than 2. In this case, in particular, in a case that only one DVRB is restricted to be allocated to one user equipment, information for scheduling the allocation of an actual physical time-frequency resource of the DVRB to the user equipment may be constructed by only the indexes of the PRBs constructing the DVRB (or information of any format which can sequentially indicate the indexes of the PRBs).

DVRB information 61 indicating DVRBs via which data is actually transmitted/received to/from the user equipment, among the DVRBs which are estimated via the PRB information for the DVRB 60, is informed together with the PRB information for the DVRB 60. The DVRB information may be constructed in a form directly identifying the DVRBs. For example, the DVRB information may become index information of the DVRBs via which the data is transmitted/received to/from the user equipment.

The DVRB information may be constructed so as to identify first DVRB information and information indicating via how many DVRB the data is transmitted/received to/from the user equipment. In order to inform the first DVRB information, it is assumed that the indexes are allocated to the DVRBs according to a predetermined rule. Information about the number of DVRBs via which the data is transmitted/received may be replaced with the amounts of REs used for transmission/reception of the data.

For example, it is assumed that scheduling is performed according to the DVRB construction method shown in FIG. 5. That is, it is assumed that four DVRBs are constructed using a total of four PRBs and the transmission/reception of the data to/from the user equipment is performed via the DVRB having a DVRB index of 4.

In this case, the PRB information for the DVRB 60 may become the index information of the PRBs and the bitmap information for identifying the PRBs as described above. If the index information is transmitted, the index information allocated to first, second, fifth and seventh PRBs of FIG. 5 is transmitted. At this time, as described above, when it is assumed that $N_{max}$=66 PRBs can be used as a maximum, the index of any PRB or a specific PRB of the first, second, fifth, and seventh PRBs may be repeated and transmitted using the remaining bits of two remaining PRB indexes. If the bitmap information is transmitted, the bitmap bits of the first, second, fifth and the seventh PRBs are, for example, set to 1 and are transmitted such that it is indicated that the transmission/reception of the data is performed.

In a case that the DVRB information 61 is constructed in a manner of directly indicating the DVRBs, information corresponding to the DVRB index information of 4 is transmitted. In a case that the DVRB information 61 is constructed by the first DVRB information among the DVRBs via which the data is transmitted/received to/from the user equipment and the information for informing the user equipment of via how many DVRBs the data is transmitted/received, information corresponding to one DVRB and the DVRB index information of 4 is transmitted.

A base station scheduler freely selects PRBs in each subframe and constructs the DVRB using the above-described method such that the FDS transmission method and the FSS transmission method are freely multiplexed.

Figure 8:
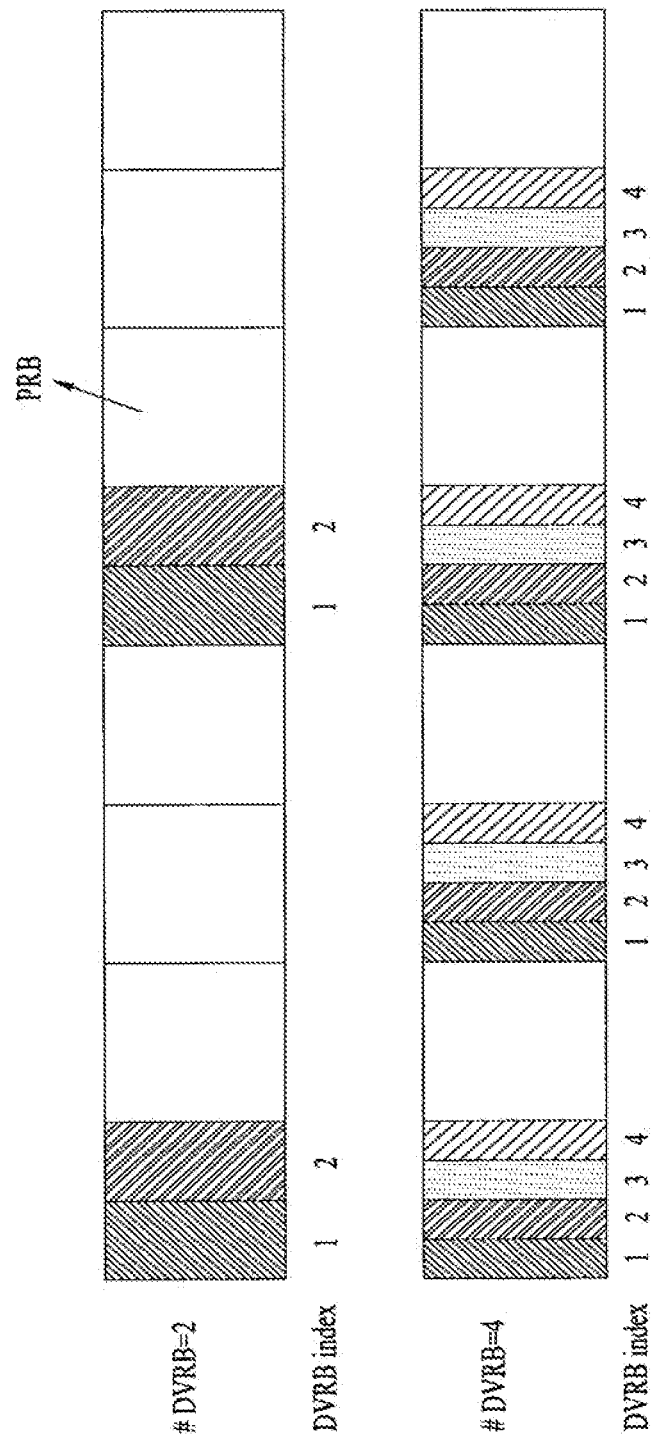
FIG. 8 is a view illustrating an example of a method for constructing a DVRB according to another embodiment of the present invention.

FIG. 8 is a view illustrating an example of a method for constructing a DVRB according to another embodiment of the present invention.

In the present embodiment, as shown in FIG. 8, the construction of the PRBs used for DVRB transmission and the DVRB using the PRBs are actually decided according to the number of PRBs for the DVRB used for the transmission/reception of the DVRB method and the numerals are allocated to the decided DVRBs according to a predetermined rule.

For example, at an upper side of FIG. 8, if the number of PRBs for DVRB used for the DVRB transmission/reception is two, the PRBs used for the DVRB transmission are the first and fifth PRBs and the RES in each PRB are divided into two groups and the indexes 1 and 2 are sequentially allocated to the two groups. The RE groups, to which the same index is allocated in each PRB, are combined so as to construct a DVRB.

Similarly, at a lower side of FIG. 8, if the number of PRBs for the DVRB used for the DVRB transmission/reception is 4, the PRBs used for the DVRB transmission are the first, third, fifth and seventh PRBs and the REs in each PRB are divided into four groups and the indexes 1, 2, 3 and 4 are sequentially allocated to the four groups. The RE groups, to which the same index is allocated in each PRB, are combined so as to construct a DVRB.

Figure 9:
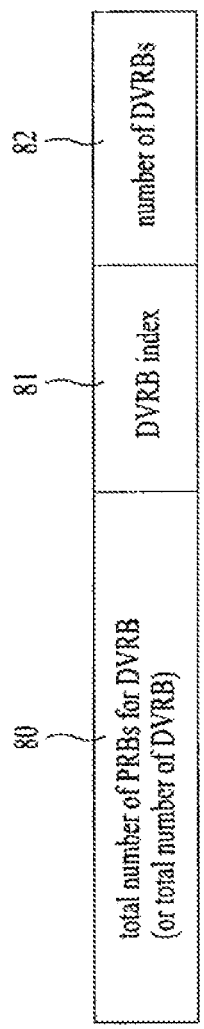
FIG. 9 is a view illustrating an example of a scheduling information construction method with respect to scheduling using a DVRB according to another embodiment of the present invention.

FIG. 9 is a view illustrating an example of a scheduling information construction method with respect to scheduling using a DVRB according to another embodiment of the present invention.

As described with respect to FIG. 8, in a case where a method for deciding the PRB and DVRB construction used for the DVRB transmission/reception method according to the total number of PRBs for the DVRB used for the DVRB transmission/reception method in a subframe is used, the scheduling information which can be transmitted by the base station will be described. In this case, in the present embodiment, in a case that the base station transmits/receives the data to/from any user equipment in any subframe, a method for informing the user equipment of the following information is suggested. That is, FIG. 9 shows the scheduling information for a user equipment.

The base station informs the user equipment of the total number of PRBs for the DVRB 80 used for the DVRB transmission/reception method in any subframe. Here, the total number of PRBs for the DVRB may be replaced with the total number of DVRBs. As described above, if the total number of PRBs for DVRB 80 used for the DVRB transmission/reception method is known, the user equipment can know the construction of the PRBs used for the DVRB transmission and the DVRB using the PRBs.

The DVRB information used for the transmission/reception of the data to/from the user equipment is transmitted. If a rule that the data is transmitted/received via the DVRBs having the consecutive numerals is applied to a user equipment, the base station informs the user equipment which transmits/receives the data via the DVRBs of an index of a start DVRB 81 and the number of DVRB 82 so as to inform the user equipment of the DVRBs via which the data is transmitted/received. Here, the number of DVRBs 82 may be replaced with the amount of REs.

For example, it is assumed that the scheduling is performed according to the DVRB construction method shown at the lower side of FIG. 8. That is, if the number of PRBs for the DVRB used for the DVRB transmission/reception method is 4, the PRBs used for the DVRB transmission are first, third, fifth and seventh PRBs, the REs in each PRB are divided into four groups and the indexes 1, 2, 3 and 4 are sequentially allocated to the tour groups. It is assumed that the RE groups, to which the same index is allocated in each PRB, are combined so as to construct a DVRB.

In this case, the total number of PRBs 80 used for the DVRB transmission/reception method is 4. A receiver receives the total number of PRBs for the DVRB 80 of 4, which is used for the DVRB transmission/reception method, and knows that the DVRB is constructed as shown at the lower side in FIG. 8. In the case that the DVRB information is constructed in a manner of directly indicating the DVRBs, the information corresponding to the DVRB index information of 4 is transmitted. When the start DVRB index 81 and the number of DVRBs 82 are transmitted as the DVRBs via which the data is transmitted/received to/from the user equipment, the information corresponding to a DVRB and the DVRB index information of 4 is transmitted. The receiver receives the information and knows that the data is transmitted/received using a DVRB having the DVRB index of 4.

By the above-described method, a base station scheduler freely selects PRBs in each subframe and constructs the DVRB such that the FDS transmission method and the FSS transmission method are freely multiplexed.

In more detail, in the above-described embodiment, the user equipments which transmit/receive the data via the DVRBs may be informed of the total number of PRBs for the DVRB 80 used for the DVRB transmission/reception method via a control channel for transmitting the scheduling information to the user equipments. When the total number of PRBs for the DVRB 80 used for the DVRB transmission/reception method is transmitted to the user equipments which transmit/receive the data via the DVRBs, bits for transmitting this information do not need to be added.

The user equipments cannot know whether the group scheduling information or bitmap scheduling information is transmitted via the LVRB or whether DVRB scheduling information is transmitted, before decoding and reading a downlink control channel for transmitting the scheduling information. Accordingly, it is efficient that the downlink control channel for transmitting this information is constructed by applying the same encoding to the same number of bits, regardless of the scheduling method. That is, it is preferable that information indicating which scheduling method is applied is included in the information bits indicating the scheduling information and information which should be indicated by the scheduling method is included in the remaining part.

At this time, since the part-bitmap scheduling information or the group scheduling information via the LVRB indicates the LVRBs via which the data is transmitted/received by a bitmap method, if the number of LVRBs in the subframe is large, a large bit number is required. For example, in a case that 48 LVRBs are divided into 3 LVRB groups so as to construct group scheduling information, 16 bits are necessary for indicating the LVRB group for transmitting/receiving the data. That is, the scheduling information should be transmitted via at least 16 bits.

In the DVRB scheduling method suggested by the present invention, since only a first DVRB index for performing data transmission/reception and the number of DVRBs via which the data is transmitted/received to/from the user equipment are informed, only 12 bits are required as a maximum. Accordingly, since at least 16 bits are required for the scheduling information transmission via the LVRB, although the total number of PRBs used for the DVRB transmission/reception method is added, the downlink resource used for the control channel for transmitting the scheduling information is not increased or is decreased.

Figure 10:
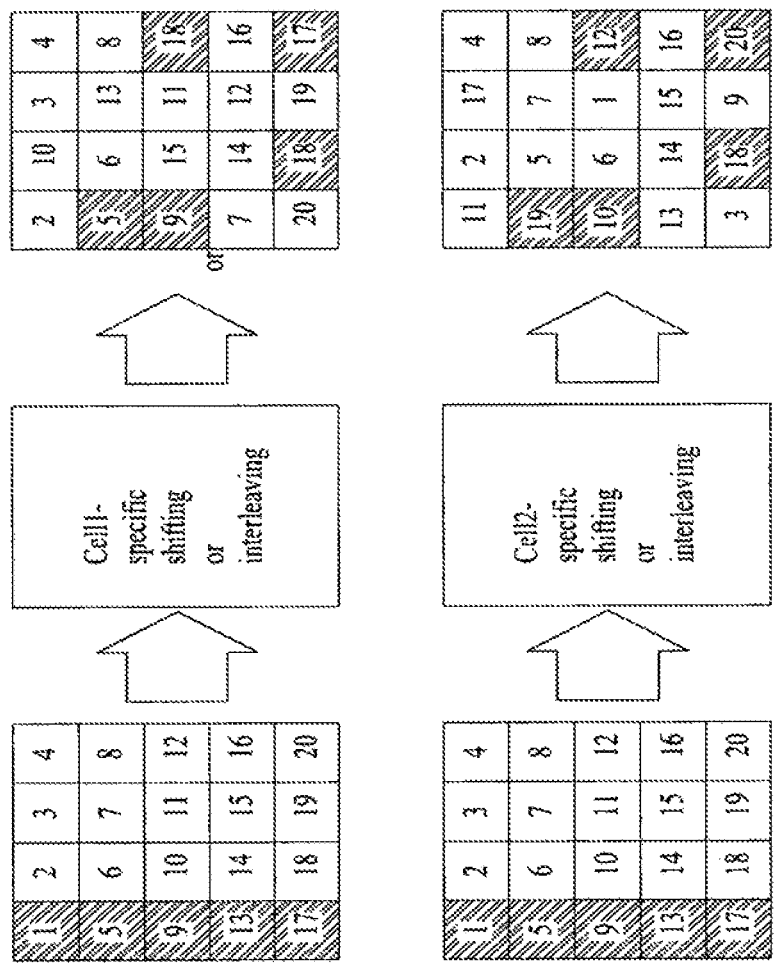
FIG. 10 is a view illustrating an example of a method for constructing different DVRBs with respect to cells according to an embodiment of the present invention.

FIG. 10 is a view illustrating an example of a method for constructing different DVRBs with respect to cells according to an embodiment of the present invention.

If a DVRB construction method which is equally defined by every cell is applied to a cellular system, a probability that the REs in a specific DVRB allocated to the data transmission of a user equipment are completely matched to the REs in a specific DVRB allocated to the data transmission of another user equipment of a neighboring cell is very high. In this case, in particular, in a case that the two user equipments of the neighboring cells having the same DVRB allocated to the data transmission are close to each other, relatively high interference may occur compared with other user equipments. Accordingly, in order to avoid the case where the REs in a specific DVRB of one cell are completely matched to the REs in a specific DVRB of another cell, randomization of the REs in the specific DVRB is required.

Accordingly, in the present embodiment, in order to randomize the REs allocated to the DVRBs in different cells, a method for differently defining the relative position of the subcarrier, the position of the OFDM symbol or the position of the RE in the PRB for the DVRB in each cell is suggested.

FIG. 10 shows an example of setting the position for mapping the RE to any DVRB using different interleaving methods in two cells in the unit of an RE. That is, indexes 1 to 20 are allocated to 20 REs included in each PRB for the DVRB used for the DVRB transmission. Interleaving or shifting is performed with respect to the 20 REs included in each PRB for the DVRB. The positions of the REs for the RE index varies according to the cells.

In other words, although the RE having the same index is allocated to the DVRB according to the cells, the positions of the physical subcarriers or the OFDM symbols may be different from each other. The interleaving or shifting rule used at this time can more efficiently perform randomization if a cell ID is input. In the interleaving or shifting rule, a random sequence may be input together with or independent of the cell ID.

The interleaving operation or the shifting operation may be performed in the unit of an RE or the unit of an RE group. For example, the interleaving operation or the shifting operation may be performed in the unit of an RB belonging to the same subcarrier or the unit of an RE belonging the same OFDM symbol. In addition, the interleaving operation or the shifting operation may be performed over all the PRBs allocated to the DVRB transmission or some PRBs in a subframe as well as each PRB.

Figure 11:
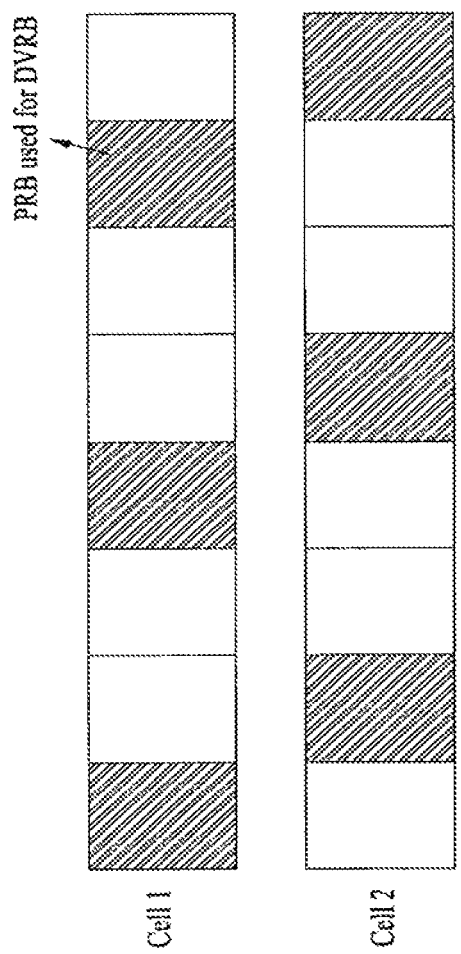
FIG. 11 is a view illustrating an example of a physical resource block (PRB) selection method used for transmission of different DVRBs with respect to cells according to an embodiment of the present invention.

FIG. 11 is a view illustrating an example of a PRB selection method used for transmission of different DVRBs with respect to cells according to an embodiment of the present invention.

In the present embodiment, in order to randomize interference between neighboring cells for the REs allocated to the DVRB and prevent the interference between the PRBs allocated to the DVRB from occurring between the neighboring cells, a method for changing the selection of the PRB for the DVRB allocated to the DVRB transmission in the subframe is provided.

FIG. 11 shows an example of a method for changing the selection of the PRB for the DVRB allocated to the DVRB transmission in the subframe. For example, the DVRB is constructed using the first, fourth and seventh PRBs in a cell 1, but the DVRB is constructed using the second, fifth and eighth PRBs in a cell 2 unlike the cell 1.

In order to change the selection of the PRB for the DVRB allocated to the DVRB transmission in each cell, different shifting or interleaving operation can be used with respect to the PRB index. In the shifting or interleaving rule used at this time, for example, a cell ID or a predetermined random sequence may be input, similar to the randomization of the RE position.

Among the methods for transmitting the data, in the FSS method, since the data is transmitted using consecutive subcarriers in the frequency domain, it is preferable that the data is transmitted using the LVRB. Among the methods for transmitting the data, in the FDS method, it is preferable that the data is transmitted using the DVRB in order to transmit the data using the inconsecutive subcarriers in the frequency domain.

Figure 12:
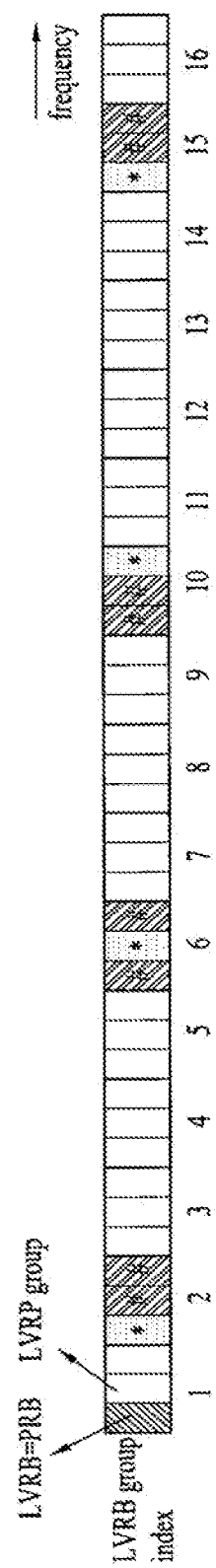
FIG. 12 is a view illustrating a method for multiplexing transmission using a DVRB and transmission using a LVRB in a subframe and transmitting the multiplexed signal according to an embodiment of the present invention.

FIG. 12 is a view illustrating a method for multiplexing transmission using a DVRB and transmission using a LVRB in a subframe and transmitting the multiplexed signal according to an embodiment of the present invention.

As described above, it is preferable that the transmission using the DVRB and the transmission using the LVRB are multiplexed in a subframe. In particular, a method for deciding the position and the number of PRBs (hereinafter, referred to as DPRB) used for the DVRB transmission method by the number of DVRBs transmitted actually similar to the above-described method and directly/indirectly informing the user equipments in the cell of this information is applied to the DVRB transmission. If scheduling using the LVRB group is applied before the LVRB scheduling, a part of PRBs constructing any LVRB group in any subframe may be allocated to the DVRB transmission.

For example, referring to FIG. 12, 48 PRBs exist in a subframe and three PRBs are combined so as to construct a LVRB group. Thus, 16 LVRB groups exist. At this time, it PRBs represented by "*" are allocated to the DVRB, second, sixth, tenth and fifteenth LVRB groups collide with the DVRB transmission at the time of LVRB group transmission.

Accordingly, in the present embodiment, in a case that a part of any LVRB group is used for the DVRB transmission to any user equipment, a method for transmitting the data transmitted to another user equipment via the LVRB group using only the LVRB which is not used for the DVRB transmission is suggested. That is, in the example of FIG. 12, if the data is transmitted to any user equipment via the second LVRB group by the LVRB group scheduling, the LVRB transmission can be performed with respect to the user equipment via two remaining PRBs excluding the first PRB used for the DVRB transmission among three PRBs in the second LVRB group, that is, the PRBs represented by "#".

In a case that the PRB used for the DVRB transmission among the PRBs constructing the LVRB group is present when the scheduling information indicating that the data is received via a specific LVRB group is received, the user equipment determines that the data is not received via the PRB and receives the data which is transmitted via the LVRB with respect to the remaining PRBs.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

That is, the present patent is not limited to the embodiments described herein and should be interpreted to have the widest range according to the principles and features disclosed herein.

INDUSTRIAL APPLICABILITY

The present invention is applicable to a mobile communication system, a cellular mobile communication system and a cellular multiplexing carrier system.

What is claimed is:

1. A method for a user equipment (UE) operating in a wireless communication system, the method comprising:
receiving, by the UE, control information including first information and second information, wherein the first information indicates one of two resource allocation types and the second information includes a bitmap indicating resource allocation; and
receiving, by the UE, the data using one or more resource blocks (RBs) allocated by the control information,
wherein, if the first information indicates a first resource allocation type of the two resource allocation types, a first bit value of the bitmap indicates whether a corresponding resource block group (RBG) is allocated or not;
if the first information indicates a second resource allocation type of the two resource allocation types, the control information includes third information indicating one of N RB sets, and a second bit value of the bitmap indicates whether a corresponding RB is allocated or not in the indicated RB set comprising a plurality of RBGs,
a size of RBG is N consecutive RBs, and N is an integer equal to or greater than 2, and
wherein the indicated RB set comprises a plurality of RBGs, in which neighboring RBGs are spaced by N−1 RBG(s).

2. The method according to claim 1, wherein the indicated RB set comprises every $N_{th}$ RBG starting from a predetermined RBG.

3. The method according to claim 1, wherein the first bit value of the bitmap indicates whether a corresponding resource block group (RBG) is allocated or not in consecutive RBGs.

4. The method according to claim 1, wherein a number of RBs in each RBG depends on a total number of RBs in a subframe.

5. The method according to claim 1, wherein a number of the RB sets is the same as a number of RBs in each RBG.

6. A user equipment (UE) operating in a wireless communication system, the UE comprising:
a radio frequency (RF) module; and
a processor configured to control the RF module,
wherein the processor is configured to receive control information including first information and second information, wherein the first information indicates one of two resource allocation types and the second information includes a bitmap indicating resource allocation, and to receive the data using one or more resource blocks (RBs) allocated by the control information,
wherein, if the first information indicates a first resource allocation type of the two resource allocation types, a first bit value of the bitmap indicates whether a corresponding resource block group (RBG) is allocated or not;
if the first information indicates a second resource allocation type of the two resource allocation types, the control information includes third information indicating one of N RB sets, and a second bit value of the bitmap indicates whether a corresponding RB is allocated or not in the indicated RB set comprising a plurality of RBGs,
a size of RBG is N consecutive RBs, and N is an integer equal to or greater than 2, and
wherein the indicated RB set comprises a plurality of RBGs, in which neighboring RBGs are spaced by N−1 RBG(s).

7. The UE according to claim 6, wherein the indicated RB set comprises every $N_{th}$ RBG starting from a predetermined RBG.

8. The UE according to claim 6, wherein the first bit value of the bitmap indicates whether a corresponding resource block group (RBG) is allocated or not in consecutive RBGs.

9. The UE according to claim 6, wherein a number of RBs in each RBG depends on a total number of RBs in a subframe.

10. UE according to claim 6, wherein a number of the RB sets is the same as a number of RBs in each RBG.

* * * * *